United States Patent
Touch et al.

(10) Patent No.: US 8,306,047 B2
(45) Date of Patent: Nov. 6, 2012

(54) PACKET SWITCH WITH SEPARATE LOOK AHEAD, COMPUTATION, AND SHIFT PHASES

(75) Inventors: Joseph D. Touch, Manhattan Beach, CA (US); Joseph Bannister, Palos Verdes Estates, CA (US); Stephen Suryaputra, Cary, NC (US)

(73) Assignee: University of Southern California, Los Angeles, CA (US)

(*) Notice: Subject to any disclaimer, the term of this patent is extended or adjusted under 35 U.S.C. 154(b) by 272 days.

(21) Appl. No.: 12/845,616

(22) Filed: Jul. 28, 2010

(65) Prior Publication Data

US 2011/0026534 A1    Feb. 3, 2011

Related U.S. Application Data

(60) Provisional application No. 61/229,635, filed on Jul. 29, 2009.

(51) Int. Cl.
*H04L 12/28* (2006.01)
(52) U.S. Cl. .......................................... 370/422; 398/51
(58) Field of Classification Search .......... 370/351–429; 398/51
See application file for complete search history.

(56) References Cited

U.S. PATENT DOCUMENTS
7,693,421 B2 * 4/2010 Harai ............................. 398/54

OTHER PUBLICATIONS

Haas, Z. 1993. The "Staggering Switch": An Electronically Controlled Optical Packet Switch. Journal of Lightwave Technology, May/Jun. 1993, vol. 11, No. 5/6, pp. 925-936.
Hunter, D.K. et al. 1998. SLOB: A Switch with Large Optical Buffers for Packet Switching. Journal of Lightwave Technology, Oct. 1998, vol. 16, No. 10, pp. 1725-1736.
Hunter, D.K. et al. 2000. Approaches to Optical Internet Packet Switching. Optical Networking Solutions for Next-Generation Internet Networks. IEEE Communications Magazine, Sep. 2000, pp. 116-122.
Shiramizu, Y. et al. 2008. All-optical autonomous first-in—first-out buffer managed with carrier sensing of output packets. Optical Engineering, Aug. 2008, vol. 47, No. 8, pp. 085006-1 to 085006-8, DOI:10.1117/1.2965546.
Suryaputra, S. et al. 2009. The Case of a Precognition Optical Packet Switch. IEEE High Speed Networks, 6 pages.
Suryaputra, S. et al. 2009. The Tetris Switch. USC/ISI-TR-662, Technical Report, Aug. 7, 2009.
Suryaputra, S. et al. 2010. Lookahead Forward Shift Optical Packet Switch. Poster presented Mar. 14, 2010, 2 pages.

(Continued)

*Primary Examiner* — Kevin C Harper
*Assistant Examiner* — Henry Baron
(74) *Attorney, Agent, or Firm* — McDermott Will & Emery LLP (57) ABSTRACT

A packet switch architecture that can switch optical packets at high throughputs without using any random access memory, without fragmenting variable length packets into fixed length fragments and reassembling them, and without converting the optical packets into electronic packets. Programmable delay lines are use which delay the output of each packet for a programmable amount which may be re-programmed while the packet is being delayed by the programmable delay line. Programmable delay line controllers manages the delays imposed by the programmable delay lines so as to have a look-ahead phase during which information about the packets is gathered and a shift phase during which the sequence of packets is shifted to match an output sequence.

28 Claims, 8 Drawing Sheets

OTHER PUBLICATIONS

Tancevski, L. et al. 1999. A New Scheduling Algorithm for Asynchronous, Variable Length IP Traffic Incorporating Void Filling. Optical Fiber Communication Conference, 1999, and the International Conference on Integrated Optics and Optical Fiber Communication, OFC/IOOC '99, Technical Digest, 3 pages.

Yang, H. 2005. Combined Input and Output All-Optical Variable Buffered Switch Architecture for Future Optical Routers. IEEE Photonics Technology Letters, Jun. 2005, vol. 17, No. 6, pp. 1292-1294.

* cited by examiner

PACKET SWITCH WITH SEPARATE LOOK AHEAD, COMPUTATION, AND SHIFT PHASES

CROSS-REFERENCE TO RELATED APPLICATION

This application is based upon and claims priority to U.S. provisional patent application 61/229,635, entitled "Packet Switch Using First-In First-Out Queues," filed Jul. 29, 2009, the entire content of which is incorporated herein by reference.

STATEMENT REGARDING FEDERALLY SPONSORED RESEARCH

This invention was made with Government support under Contract No. CNS-0626788 awarded by the National Science Foundation; under Contract No. N66001-02-1-8939 awarded by Defense Advanced Research Projects Agency (DARPA); and under Contract No. CNS-0812072 awarded by the National Science Foundation. The Government has certain rights in the invention.

BACKGROUND

1. Technical Field

This disclosure relates to packet switches for network systems, including packet switches which switch optical packets.

2. Description of Related Art

Packet switches commonly receive streams of packets on several different input ports and route each to an output port based at least in part on information specified in the header for the packet.

Packets designated for the same output port sometimes arrive on different input ports at the same time or at least at overlapping times. Random-access buffers are commonly used to temporarily hold one or more of these packets so that they can be later delivered to the output port without overlap.

Very high speed networks, however, may use optical packets. i.e., information that is communicated by modulated light. As of yet, random-access buffers which can buffer optical packets are not believed to exist. Although optical packets can be converted to electronic packets and then buffered by random-access buffers, this can slow down the routing of the optical packets substantially. Without buffers, moreover, optical packet switches have generally not been able to achieve the same level of throughput performance as electronic ones.

SUMMARY

A packet switch may route packets. A plurality of input ports may each be configured to receive one or more of the packets. A plurality of output ports may each be configured to deliver one or more of the packets.

For each input port, a demultiplexer may be configured to receive each packet on the input port and to direct it to an output representative of one of the output ports based at least in part on information in a header for the packet.

For each output of each demultiplexer, a programmable delay line may be configured to receive each packet from the output of the demultiplexer and to delay the output of each packet from the programmable delay line for a programmable amount which may be re-programmed while the packet is being delayed by the programmable delay line.

There may be a programmable delay line controller for each set programmable delay lines that are configured to receive packets from the outputs of demultiplexers that are representative of the same output port. The programmable delay line controller may be configured to repeatedly program the set of programmable delay lines to delay packets which they receive during a look-ahead period, examples of which are described below.

At the end of each look-ahead period, the programmable delay line controller may be configured to determine for the packets which have been received by the set of programmable delay lines during the look-ahead period: an output sequence for the packets; and for each of the packets, the amount of remaining delay needed within its programmable delay line to cause the packet to arrive at the output of its programmable delay line in conformance with the determined output sequence.

After this determining, the programmable delay line controller may be configured to re-program each of the set of programmable delay lines, as needed, to provide the determined remaining delay for that programmable delay line.

A multiplexer may be configured to receive the packets from the outputs of the set of programmable delay lines and to multiplex them together onto the output port with which the set of programmable delay lines are associated.

Each programmable delay line controller may be configured to end each look-ahead period a pre-determined amount of time after it begins.

Each programmable delay line controller may be configured to drop one or more of the packets which are received within a look-ahead period when this would facilitate conforming to the output sequence.

Each programmable delay line controller may be configured to determine each output sequence based at least on the length of the packets which are the subject of the output sequence.

Each programmable delay line controller may be configured to cause the first packet which is received by one of the programmable delay lines during each look-ahead period to be the first packet in each determined output sequence.

Each programmable delay line controller may be configured to re-program the programmable delay line which receives the first packet during each look-ahead period to stop delaying the output of the first packet at the end of each look-ahead period.

When determining each output sequence, each programmable delay line controller may be configured to give weight to achieving the lowest possible average output delay, the lowest possible loss of packets, and/or prioritizing information.

The input ports, the demultiplexers, the programmable delay lines, the multiplexers, and the output ports may all be optical devices configured to process packets that are carried by light.

There may be no more than one hundred or no more than ten different possible choices for each determined remaining delay.

The packet switch might not contain any memory devices configured to buffer any of the packets.

The programmable delay line controller may be configured to determine an optimal sequence for packets of different length.

There may be only one output port, i.e., resulting in a multiplexing device rather than a switch.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
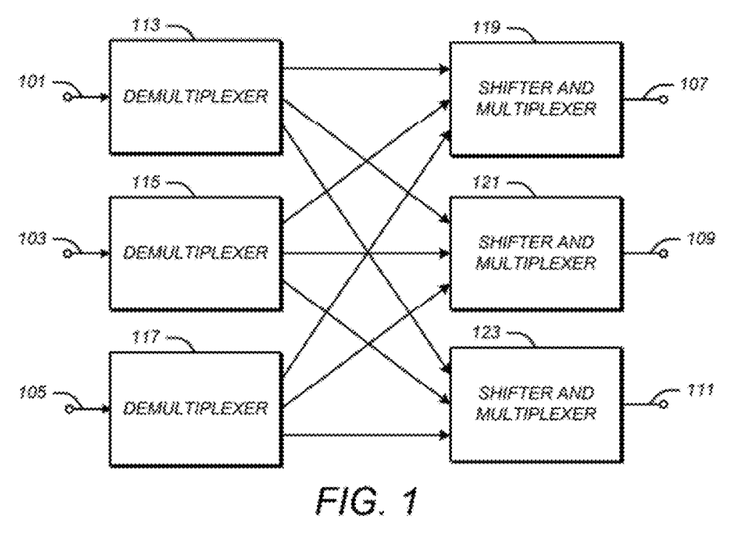
FIG. 1 illustrates a packet switch.

FIG. 1 illustrates a packet switch. As illustrated in FIG. 1, the packet switch may include a plurality of input ports, such as input port 101, 103, and 105. Each may be configured to receive one or more packets containing data and/or other information. Although only three input ports are illustrated in FIG. 1, the packet switch may have a different number, such as two, four, five, or any other number.

The packet switch may include a plurality of output ports, such as output port 107, 109, and 111. Each may be configured to deliver one or more of the packets. Although only three output ports are illustrated in FIG. 1, a different number may be used, such as one, two, four, five, or any different number. The number of output ports may not match the number of input ports; it may be larger or smaller.

The packet switch may include a plurality of demultiplexers, one for each input port, such as demultiplexers 113, 115, and 117. Each demultiplexer may be configured to receive each packet on its respective input port and to direct it to an output which is representative of an output port based at least in part on information specified in the header for the packet. In some cases, for example, the output port may be designated in the header for the packet. In other cases, for example, the output port may be indicated by a combination of the header information and an internal table.

Each of the demultiplexers may be of any type. For example, each demultiplexer may be implemented optically using a 1×N unbuffered optical switch that is equipped with optical header processors, subcarrier multiplexing, header lookup tables, and/or separates the header and payload on separate wavelengths.

The packet switch may include a shifter and multiplexer for each output port, such as shifters and multiplexers 119, 121, and 123. The packets which are delivered to each shifter and multiplexer may be those which have headers designating the output port associated with the shifter and multiplexer.

Each shifter and multiplexer may be configured to shift the packets which it receives so as to deliver them to their respective output port in an output sequence.

Figure 2:
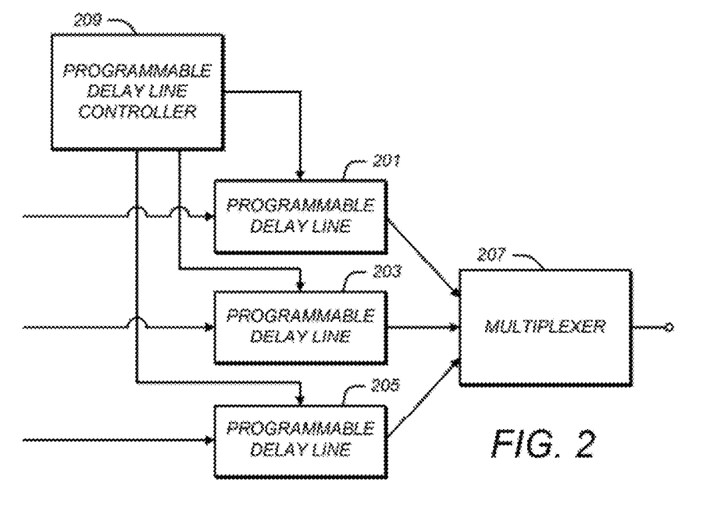
FIG. 2 illustrates a shifter and multiplexer.

FIG. 2 illustrates an example of a shifter and multiplexer. The shifter and multiplexer illustrated in FIG. 2 may be used as each of the shifters and multiplexers illustrated in FIG. 1 or in any other packet switch configuration. Similarly, the shifters and multiplexers illustrated in FIG. 1 may be different than the shifter and multiplexer illustrated in FIG. 2.

As illustrated in FIG. 2, the shifter and multiplexer may include a plurality of programmable delay lines, one for each input port, such as programmable delay lines 201, 203, and 205. The shifter and multiplexer may include a multiplexer 207 and a programmable delay line controller 209.

Each programmable delay line may be configured to receive packets from the output of a demultiplexer and to delay the output of each received packet from the programmable delay line for a programmable amount. Each programmable delay line may be configured so that the delay which it imparts to each packet can be re-programmed while the packet is within the programmable delay line and is being delayed by it.

Each programmable delay line may be configured to perform these functions in connection with optical packets, without any memory devices that are configured to buffer any of these packets, and without converting the optical packets into electronic packets.

The programmable delay line controller 209 may be configured to program the amount of delay that is provided by each programmable delay line and to reprogram that amount of delay in connection with each packet that is within each programmable delay line while it is within the programmable delay line. The programmable delay line controller 209 may thus be configured to dynamically configure the speeds of each of the programmable delay lines. The programmable delay line controller 209 may include electronics which enable the programmable delay line controller 209 to perform these functions, such as one or more logic gates, timers, and input/output devices.

The multiplexer 207 may be configured to receive the packets from the outputs of the programmable delay lines and to multiplex them together onto a single output port. The multiplexer 207 may be of any type. For example, the multiplexer 207 may be configured to multiplex optical packets without using a buffer and without converting any of the optical packets into an electronic format. For example, the multiplexer 207 may be a passive prism.

Figure 3:
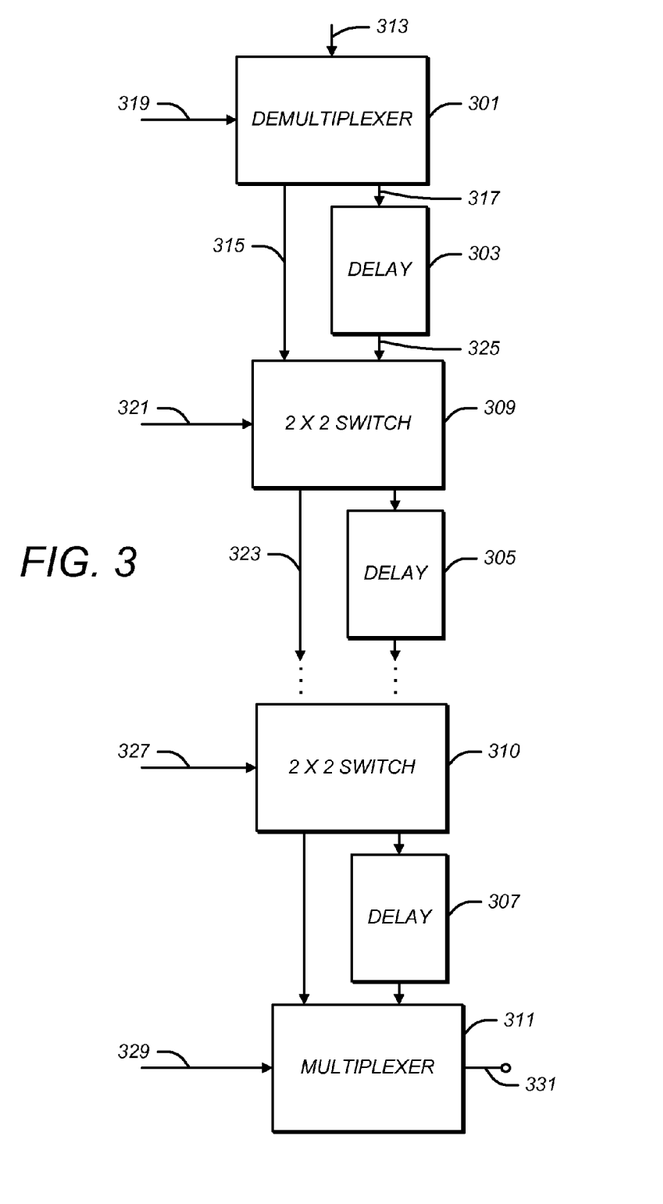
FIG. 3 illustrates a programmable delay line.

FIG. 3 illustrates a programmable delay line. The programmable delay line may be used as the programmable delay lines illustrated in FIG. 2 or in any other type of shifter and multiplexer. Similarly, the shifter and multiplexer illustrated in FIG. 2 may be of a configuration different than illustrated in FIG. 3.

As illustrated in FIG. 3, the programmable delay line may include a demultiplexer 301, delay elements, such as delays 303, 305, and 307, a 2×2 switch associated with each delay device, except for the last one, such as 2×2 switches 309 and 310, and a multiplexer 311.

The demultiplexer 301 may be of any type, such as any of the types discussed above in connection with the demultiplexers 113, 115, and 117. The demultiplexer 301 may be configured to demultiplex a packet received on an input 313 to one of two outputs 315 or 317 based on a control signal from the programmable delay line controller 209 delivered to a control signal input 319. When the control signal causes the demultiplexer 301 to deliver the packet to the output 315, the packet experiences no significant delay while traveling through this stage of the programmable delay line. When the control signal instead causes the demultiplexer 301 to deliver the packet to the output 317, that packet is delayed by the delay 303.

The 2×2 switch 309 may next be set by a control signal from the programmable delay line controller 209 to a control signal input 321 to receive the packet from either the output of the demultiplexer 313 or the output of the delay 303. The control signal to the control signal input 321 of the 2×2 switch 309 may be set to cause the 2×2 switch 309 to receive the packet on whichever input to the 2×2 switch 309 it was expected to arrive. The control signal to the control signal input 321 to the 2×2 switch 309 may also control whether the packet is delivered by the 2×2 switch 309 to a non-delayed output 323 or to a delayed output 325.

The remaining delays and 2×2 switches may function in the same way as the delay 303 and 2×2 switch 309. Although only three delay stages are illustrated in FIG. 3, the programmable delay line may have a different number. That number may be no more than 100 or no more than 10.

The delay elements may be of any type. For example, the delay elements may be configured to delay an optical packet without utilizing any type of memory buffer and without converting the optical packet into an electronic packet. Examples of devices which may function as each delay element include slow light buffers, lithium niobate delays, fiber delays, or integrated optical waveguides. The delay elements may be composed of a sequence of switches with fixed delays as shown, or may be composed of directly modifiable delays such as lithium niobate would support.

The 2×2 switches may similarly be of any type. For example, the 2×2 switches may be configured to switch optical packets and may be configured to do so without any memory buffers and without having to convert any of the optical packets into electronic packets. The switches may instead be larger than 2×2, so as to switch between no delay and different fixed delays.

A packet may ultimately reach the multiplexer 311. A control signal from the programmable delay line controller 209 to a control signal input 329 to the multiplexer 311 may tell the multiplexer on which of its two inputs the packet is expected to arrive and, as a consequence, cause the multiplexer 311 to deliver the packet on the input to which it is expected to arrive to an output port 331. The output port 331 from the multiplexer 311 may be the output of the programmable delay line.

The multiplexer 311 may be of any type, such as any of the types discussed above in connection with the multiplexer 207. For example, the multiplexer 311 may be configured to multiplex optical packets without buffering any of them in a memory buffer and without converting any of them into an electronic packet.

The programmable delay line illustrated in FIG. 3 is sometimes referred to as a variable speed conveyer (VSG). It may effectively delay an incoming packet by a controllable amount. The amount may be reprogrammed while the pocket is within the programmable delay line by changing the control signals, as needed, to the 2×2 switches which are still downstream of the packet and to the multiplexer.

Figure 4:
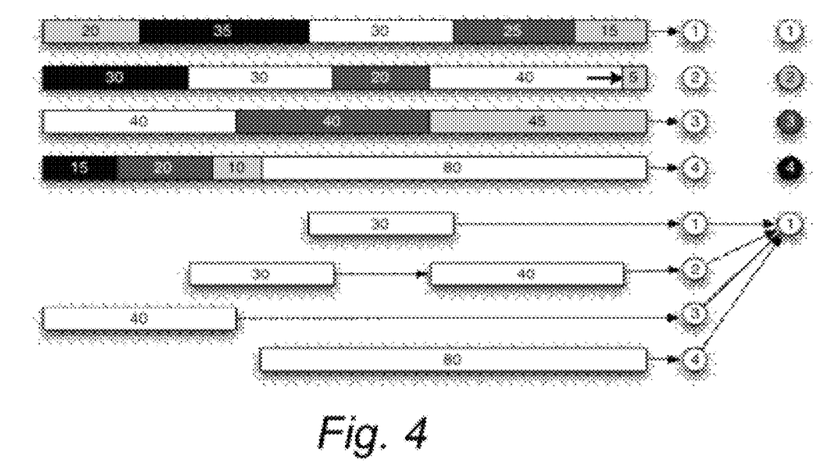
FIG. 4 illustrates packet streams on four input ports in the first four rows and, in the last four rows, those packets in the four input ports which designate the same output port in their header, after they have been separated from the other packets in these input streams.

FIG. 4 illustrates packet streams on four input ports in the first four rows. The packets may be of varying sizes, the sizes being indicated by the number imprinted on each packet. These packet streams may arrive on four different input ports, designated as input ports 1, 2, 3, and 4. Each packet may specify in its header one of four output ports, designated as output ports 1, 2, 3, and 4. The output port designations are indicated in FIG. 4 by the intensity of the gray scale fill for each packet. A different number of input ports and/or output ports may instead be used.

The last four rows in FIG. 4 illustrate the packets in the four input ports which designate output port #1 in their header, after they have been separated from the other packets in these input streams. The last four rows are an example of what packets coming into the shifter and multiplexer 107 in FIG. 1 might look like if there were four input ports, as opposed to the three illustrated in FIG. 1.

As illustrated in the bottom four rows of FIG. 4, the packets which are arriving for output port #1 on the four input ports can substantially overlap. Unless something is done before these packets are delivered to output port #1, the packets may collide, which may damage their content.

Figure 5:
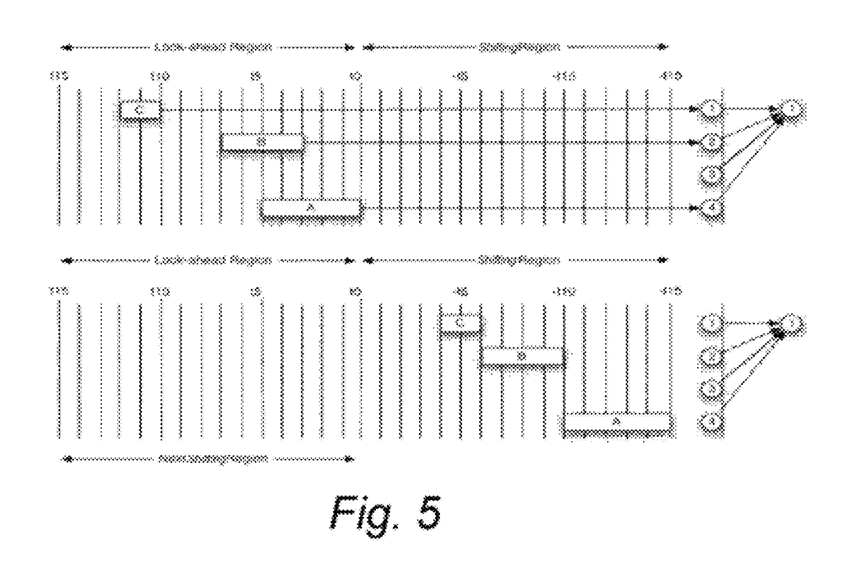
FIG. 5 illustrates packets which are within a set of programmable delay lines associated with the same output port during a look-ahead period in the first four rows and, in the last four rows, those same packets after they have been shifted while still within the programmable delay lines to be in conformance with a determined output sequence.

FIG. 5 illustrates packets which are within a set of programmable delay lines associated with the same output port during a look-ahead period in the first four rows and, in the last four rows, those same packets after they have been shifted while still within the programmable delay lines to be in conformance with a determined output sequence. As also illustrated in FIG. 5A, the packets may be of different length and may overlap.

As suggested by the first four rows in FIG. 5A, three packets arrived at three of the delay lines and, during a look-ahead period, were delayed by those delay lines. To facilitate this functionality, the programmable delay line controller 209 may be configured to command each of the programmable delay lines to which it is connected to maximally delay each arriving packet along each stage of the programmable delay line during the initial look-ahead period.

The programmable delay line controller 209 may be alerted to when each packet arrives at the input to each programmable delay line. It may further be apprised of the length of each packet, as reflected in header information for the packet. A packet header reader may be employed to obtain this information. The programmable delay line controller 209 may be configured to store this information, at least until the end of a look-ahead period.

At the conclusion of the look-ahead period, the programmable delay line controller 209 may be configured to analyze the data which it has about all of the packets which have been received by the programmable delay lines during the look-ahead period. As part of this analysis, the programmable delay line controller 209 may be configured to determine an output sequence for the packets. In connection with the packets illustrated in FIG. 5, for example, the programmable delay line controller 209 may determine that the output sequence should be packet A, followed by packet B, followed by packet C.

After determining an output sequence, the programmable delay line controller 209 may then determine the amount of remaining delay needed for each packet to arrive at the output of its respective programmable delay line in conformance with the determined output sequence. After making this determination, the programmable delay line controller 209 may be configured to reprogram each of the set of programmable delay lines, as needed, to provide the determined remaining delay for that programmable delay line.

In one configuration, the programmable delay line controller 209 may direct each of the involved programmable delay lines to immediately shift the packet which is to be part of the output sequence to a forward position which causes the entire set of packets that are part of the output sequence to line up in conformance with the output sequence, as shown in the lower four rows of FIG. 5. The programmable delay line controller 209 may do so by setting the any intervening stages of the programmable delay line not to provide any delay. The programmable delay line controller 209 may also set the remaining delay states in each involved programmable delay line to provide a delay, thus resulting in each of the shifted packets traveling out of its respective programmable delay line in conformance with the output sequence.

The second and third packets in the lower four rows of FIG. 5 are illustrated as immediately following the packets in front of them. In some configurations, there may be gaps between packets in an output sequence, especially when the only a small number of delay stages are provided each programmable delay line.

A next set of packets (not shown in FIG. 5) may arrive at and start flowing though the programmable delay lines while the shifted set of packets shown in the bottom four rows of FIG. 5 proceed to the output of the programmable delay line. Following the end of the next look-ahead period, the programmable delay line controller 209 may then again determine an output sequence for this next set of packets, along with the needed remaining delays, and direct the programmable delay lines to implement these needed delays. This entire process may then repeat in connection with each subsequently arriving set of packets.

The programmable delay line controller 209 may thus operate in different modes. During an initial look-ahead period, the programmable delay line controller 209 may cause each of the programmable delay lines to maximally delay the packets which they receive. At the end of this look-ahead period, the programmable delay line controller 209 may then determine an output sequence for the packets that were received during the look-ahead period. The programmable delay line controller 209 may then cause that sequence to be implemented by commanding the programmable delay lines to immediately cause each of the packets within them to immediately move forward by an amount which is needed to bring them in conformance with the determined output sequence. The programmable delay line controller 209 may then wait while the next set of packets arrives within the programmable delay lines until the end of the next look-ahead period, and then repeat this process for each succeeding set of arriving packets.

The programmable delay line controller 209 may be configured to initiate the look-ahead period based on any criteria. For example, the look ahead period may be initiated upon the expiration of a previous look-ahead period. The look-ahead period may instead be initiated upon the arrival of the first packet at one of the programmable delay lines.

The look-ahead period may be of any length. For example, the look-ahead period may be of a length that is comparable to half of the total maximum delay of the programmable delay lines. The arrival of the first packet to one of the programmable delay lines at the mid-point of its programmable delay line may trigger the end of the look-ahead period. Other algorithms for determining both the beginning and the end of the look-ahead period may in addition or instead be used.

The programmable delay line controller 209 may thus have phases: a look-ahead phase and a shift phase. During the look-ahead phase, it may keep track of information about the packets in its associated set of programmable delay lines. The collecting may start when the first packet enters a programmable delay line. During the shift phase, the programmable delay line controller 209 may accelerate the packets forward.

Both phases may correspond to regions of the programmable delay lines. The total delay in the programmable delay lines may be divided into two equal-sized regions: the look-ahead region and the shift region. The look-ahead region may be where the programmable delay line controller 209 examines the packet headers, determines what shifting is desired, and initiates shifting. The shift region is where the accelerated packets are shifted into, allowing packets to line up properly for the multiplexer 207.

Packet scheduling in the programmable delay lines may thus occur in rounds or batches, where there are gaps between each round. Each round may be scheduled separately, which may reduce the complexity of the programmable delay line controller 209. When a packet is still in the look-ahead region, it may initially travel the slow-path. Once the first packet arrives at the end of the look-ahead region, the programmable delay line controller 209 may shift all look-ahead packets to the fast-path. This may include other packets that are still in the middle of the look-ahead region. This operation may shift packets to the head of the input line to the multiplexer 207. The available space for shifting may be the shift region.

The output sequence which is determined by the programmable delay line controller 209 may be based on any algorithm. An output sequence for the packets may include a sequence which omits one or more of the packets. The algorithm which determines the sequence may be structured to effectuate one or more goals when determining the output sequence or at least to give weight to one or more of these considerations when making that determination. Considerations which may govern or which may at least be given weight in determining the output sequence may include, but are not limited to, minimizing the number of packets which are dropped, minimizing the average packet delay, and/or a desired arrival sequence of the packets. The output sequence may also or instead be based upon or take into consideration prioritizing information, such as information relating to the source of the packet, the type of information being carried by the packet, and/or the port on which the packet arrives. The output sequence may be an optimal output sequence or may be less than an optimal sequence, such as when a less-than-optimal output sequence is dictated by prioritizing information.

A modified first-in-first-out rule may also be followed. For example, the algorithm that determines the output sequence may be configured to always begin that sequence with the packet that first arrives at one of the programmable delay lines following the initiation of a look-ahead period. This is illustrated in FIG. 5A by packet A. It arrived first and has been placed first in the output sequence. To facilitate the first-in-first-out sequence, the programmable delay line controller 209 may be configured to move the first arriving packet to the output of its programmable delay line immediately following the end of the look-ahead period.

The programmable delay line controller 209 may be restricted in the number of possible delay choices which it may make in connection with each of the packets at the end of each look-ahead period. That limit, for example, may be no more than 100 in some cases, and no more than 10 in others.

The packet switch which has thus-far been described has been illustrated as having several output ports, three in FIG. 1, and four in FIGS. 4 and 5. As indicated above, however, the number of output ports may be different, such as one, two, five, or any greater number. When the number of output ports is one, there may only need to be one shifter and multiplexer, thus resulting in a simplification of the system which is illustrated in FIG. 1 by reducing it to a single shifter and multiplexer to which all of the input ports would be routed.

This technology can switch packets of varying size without needing to break the packets into fixed-size units and later reassembling them.

As indicated, the programmable delay line controller 209 may be configured to implement any algorithm consistent with the concept of a look-ahead period, followed by determinations and delay readjustments. For example, an earliest fit first algorithm may be implemented that may include the following steps:

A. The programmable delay line controller 209 may keep information on packets in the look-ahead region as an ordered set, sorted by arrival time. There may be one in each controller, i.e., one set per output port.

B. If a packet is first in the set, the programmable delay line controller 209 may initialize the free space ($F_S$) {where 'free space' is defined as the available space for packets to be packed into the shift region, i.e., the time between when the last packet is currently scheduled to exit the shift region and enter the multiplexer, and the last byte of the shift region} to the size of the shift region in bytes. The number of bytes in the free space can be determined from the delay (region size) and the port speed. Initialize the shifted time (T) to now+look-ahead time. This may commence the operation of a round or batch of processing.

C. At time T:
  1. Initialize $F_T$ to "now", i.e., the time when the shifted packet will hit the switch port.
  2. Pick a packet from the set with the earliest arrival time.
  3. If the packet does not have any direct predecessor (i.e., an earlier packet with the same input and output port that is still in the buffer) then:
    a) If the packet fits into $F_S$, shift the packet to $F_T$ and subtract the length of the packet from $F_S$. Set $F_T$ to the tail of this shifted packet.
    b) Else (the packet does not fit), pick the next packet (if any) and repeat step C3.
  4. Else (there is a previous packet):
    a) Check if the tail of the previous packet is earlier than $F_T$ (i.e., the earlier packet is not blocking this packet). If yes, then go to step C3a.
    b) Else, pick the next packet, if any, and repeat step C3.

D. If there are still any packets in the set, drop those packets with arrival time less than the $F_T$. This happens to packets that arrive just before the end of the last shifted packet.

E. If there are still any packets in the set, re-initialize $F_S$ and schedule another shifting operation (step 3) at time T (now+look-ahead time). The remaining packets in the set will be shifted along with other packets that may arrive between now and T.

F. If there isn't space to shift the packet forward, let the packet arrive at the mux at its usual time. It will be contending with the shifted packet, and one of them (randomly selected) will succeed.

Performance Evaluation

A simulator was developed to validate the performance of the packet switch. The analyses focused on the result of a 32×32 switch under both quasipoisson (non bursty) and pareto on/off (bursty) arrivals. Quasipoisson is a modified poisson arrival process that avoids overlapping packets on the same input port, and thus may be more appropriate for switch analysis. Pareto on/off arrivals have been used to simulate highly variable arrival processes, including Web traffic. The shape parameter $\alpha$ was set to 1.2 according to these findings. The mean burst size was 12500 bytes, the same burst size used for performance evaluation of optical burst switching.

Three packet length distributions were examined: fixed, exponential, and bimodal. For bimodal, 80% of the packets were 40 bytes long and the rest were 1500 bytes. The results presented in this section are mainly for the more realistic bimodal packet size distributions. Different packet size distributions are noted explicitly when discussed.

The output port selection for quasipoisson arrivals was configured to be uniformly distributed. For pareto arrivals, two variants were examined. In the first variant, called pareto-n, the output port was uniformly selected at the start of each burst and stayed the same until the burst ended. For the second variant, called pareto-r, the output port was uniformly selected anew for each packet. From an output port point of view, pareto-n was more bursty.

The look-ahead and shift regions were each initially set to 500,000 bytes or 4 megabits (Mb), given the simulator configuration of 1 Gb/s per port. This is higher than a currently recommended router buffer size of 2.5 Mb, based on the switch size and speed being simulated. For comparison, the performance of an unbuffered switch was shown in the same plot.

The simulator uses the standard Unix library drand48( ) function as its pseudorandom number generator. Each simulation was run multiple times to achieve 95% confidence level with accuracy of 1% of the average. The number of runs, n, was determined using the following formula:

$$n = \left(\frac{zs}{rx}\right)^2$$

where z was 1.96 from the normal probability distribution table, s and x were the standard deviation and the average from preliminary runs, and r was the desired accuracy, which was 1% or 0.01. The numbers plotted are the averages from those runs; the confidence intervals are omitted in the graphs because they may be negligible. Each run lasted for 1 s of simulated packet processing time. To validate the parameters of the simulator, a well-known input buffered switch architecture was run for the same duration and checked the output of the simulator. The simulator reported the same 58.6% throughput.

Figure 6A:
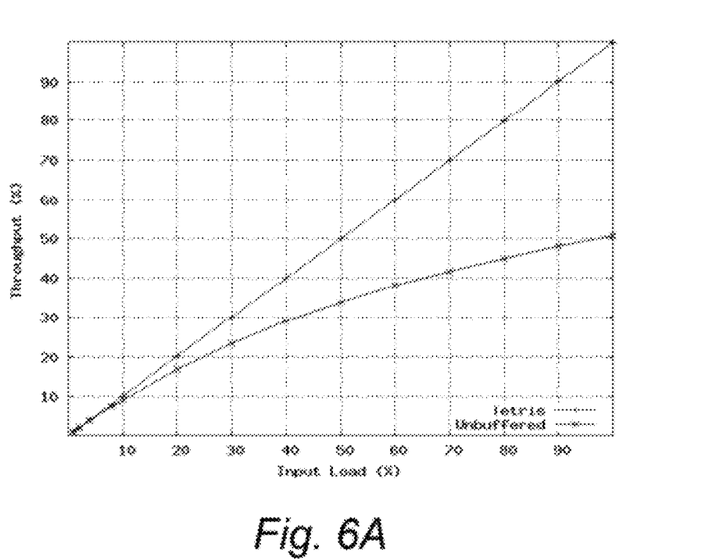
FIGS. 6A-6C illustrate throughput of a 32×32 packet switch.
Figure 6B:
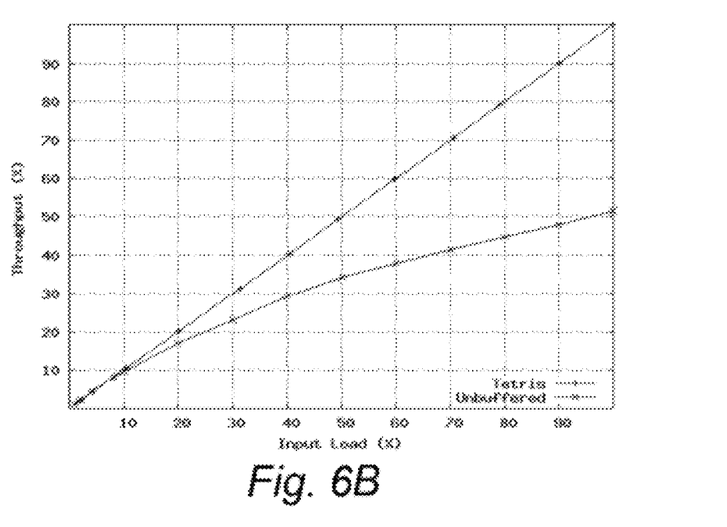
Figure 6C:
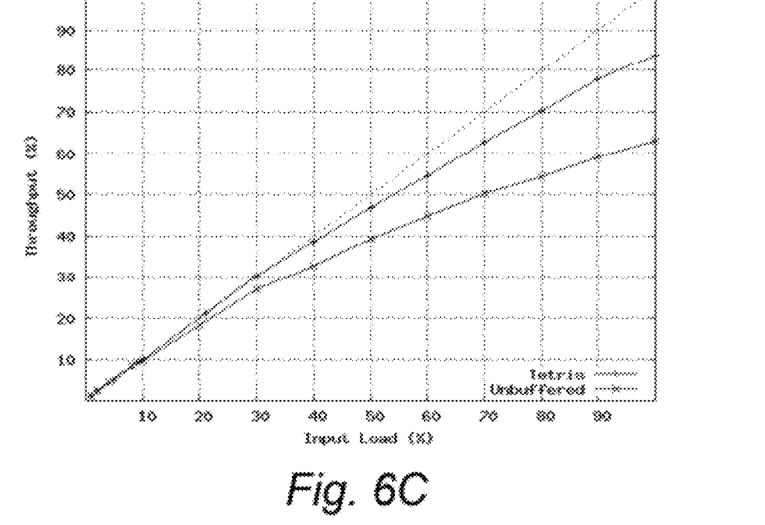

FIGS. 6A-6C illustrate throughput of a 32×32 packet switch. FIG. 6A illustrates the throughput for quasipoisson; FIG. 6B for pareto-r; and FIG. 6C for pareto-n arrivals. For a region size of 4 Mb and quasipoisson arrivals, the packet switch achieved close to 100% throughput for all the packet length distributions evaluated. For brevity, only the bimodal packet sizes are shown in FIG. 6A. Packet drops did occur, but at a very low level. The result for pareto-r arrivals and bimodal packet sizes showed that the packet switch also provided noteworthy improvement over an unbuffered switch, as illustrated by FIG. 6B. The result is similar to that of quasipoisson. Even though the traffic was bursty on the link, it was not bursty from an output port viewpoint. This may be due to the uniform selection of output port for every packet in the burst in a pareto-r distribution.

In contrast, the result for pareto-n arrivals (also with bimodal packet sizes) shows that the packet switch did not achieve the desired near-100% throughput. It achieved only 83% throughput under 100% input load, as illustrated in FIG. 6C. The throughput eventually went to over 90% when the region sizes were increased to 64 Mb each. The decreased throughput (or, alternately, need for larger region sizes) was expected, however, because this traffic was bursty from an output port point of view.

Burstiness also affected the performance of an unbuffered switch. FIG. 6D shows that pareto-n performed better on unbuffered switches than quasipoisson (FIG. 6A) or pareto-r (FIG. 6B). This may be attributed to using a single output port for every packet in a burst. When an input port sends a burst to an output port, it may not send each packet to a different output port. In effect, this may reduce the chance of having multiple input ports send to the same output port at the same time. Hence, the throughput of the unbuffered switch may be improved for this kind of traffic.

Short-term variations in load did not have much effect on any of the throughputs indicated in FIGS. 6A-6C because the shift region was far larger than the packets. Even with a uniform switching matrix, short-term variations of input load may cause the number of bytes destined to an output port to be greater than the number of bytes available in the shift region. This may cause the packet switch to execute the spill steps and drop packets. The effect may be more significant as the size of the regions decreases.

Figure 7A:
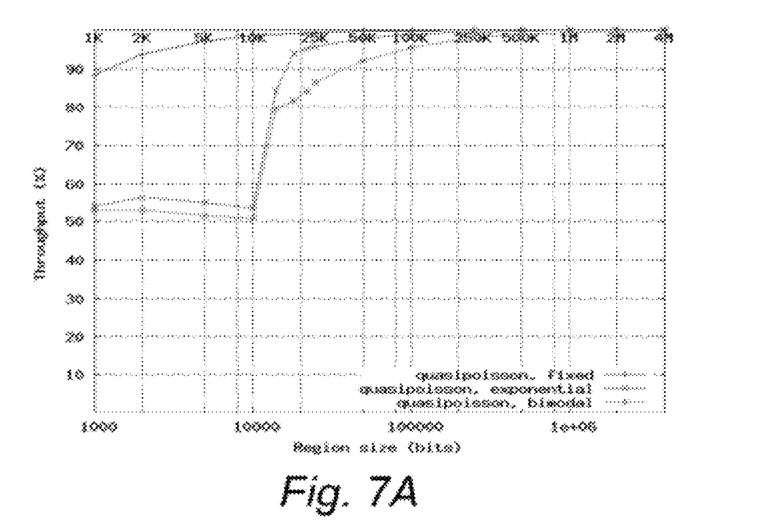
FIGS. 7A and 7B illustrate throughput of a 32×32 packet switch as the look-ahead and shift region sizes get smaller at 100% input load.
Figure 7B:
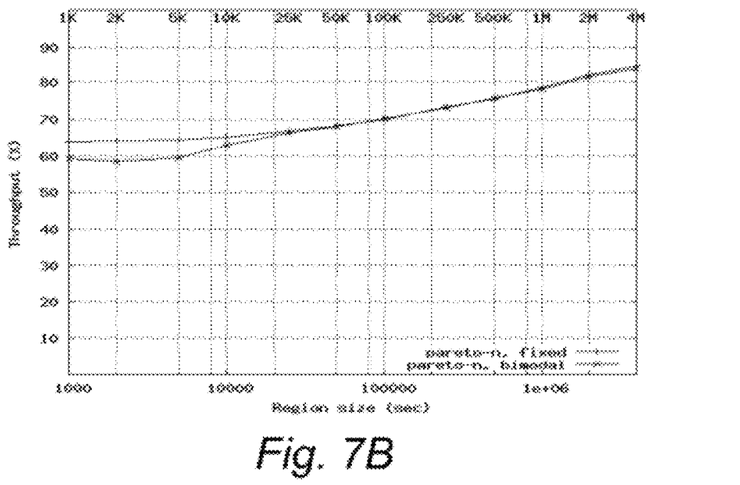

FIGS. 7A and 7B illustrate throughput of a 32×32 packet switch as the look-ahead and shift region sizes got smaller at 100% input load. FIG. 7A illustrates an arrival process which was quasipoisson; FIG. 7B illustrates an arrival process which was pareto-n. They illustrate the effect of lowering the region sizes to 1 kilobit (kb).

The packet switch throughput still was above 90% for quasipoisson arrivals, even for a small delay for the packet length distributions considered (50 kb per region, i.e., 6250 bytes or four 1500-byte packets). The performance level for bursty traffic was also lower due to the prolonged variation of input load. For quasipoisson arrivals, the throughput dropped significantly when the regions were smaller than 25 kb, or two 1500 byte packets, as reflected in FIG. 7A. A steep shift in the graph, or "cliff", was observed for both exponential and bimodal packet lengths. This is expected because there is insufficient space to hold bigger packets, or smaller packets when a bigger packet occupies the shift region. The cliff shows a drop to the performance level of an unbuffered switch. Pareto-n arrivals, however, do not exhibit the same level of drop, as reflected in FIG. 7B.

A small jump was observed for variable size packets when the region size was lowered from 10 kb to 5 kb or 2 kb. This may be due to Step F in the algorithm. To maximize throughput when the region size is small, unshifted packets continued to propagate toward the multiplexer (as per a conveyor queue, i.e., the conveyors keep moving). When the multiplexer was idle, the packet was forwarded directly to the output port. When the multiplexer was busy (i.e., forwarding a different packet), the packet arriving at the multiplexer was dropped. The same operation was applied to shifted packets as well. Thus, when a large packet was being considered for shifting, smaller regions caused it to be unshiftable more often. The shifted packets were more often the smaller packets. The more unshifted packets hit the multiplexer, the more they were successfully forwarded. The shifted packets, which had smaller sizes, therefore, were more likely to be dropped. Thus, their throughput was slightly increased. When the regions were set to 1 kb, the mix of unshifted packets changed. There were more small packets that were unshiftable. This lessens the effect of unshifted packets monopolizing the multiplexer.

Results in FIGS. 6 and 7 were obtained by simulating the shifting of packets at arbitrary times. This may not be realistic, given the design of the VSC queue shown in FIG. 3. However, placing the selector element at every smallest packet size interval should emulate shifting at arbitrary times. This was validated by simulating the discrete shifting points at every 320 bits (equivalent to one 40-byte minimal IPv4 packet, or at most 40 different shifts for a 1500 byte packet) and 640 bits (two such packets) for equal region sizes of 50 kb.

Figure 8:
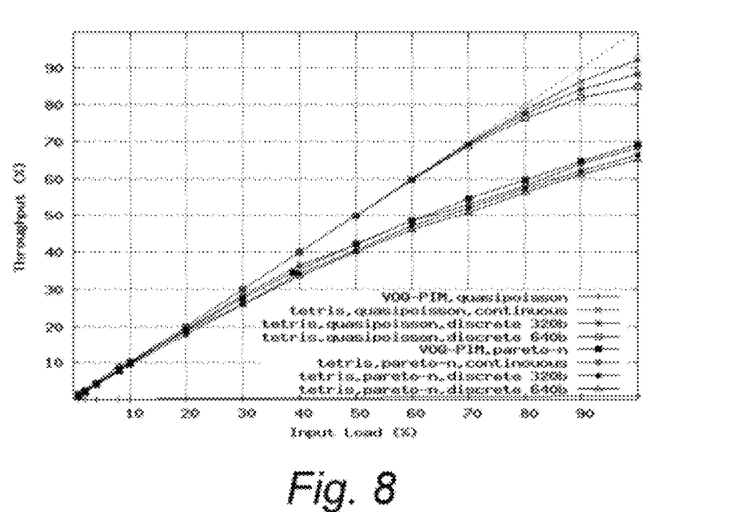
FIG. 8 illustrates throughput of a 32×32 packet switch with equal look-ahead and shift region sizes of 50 kb as compared to an electronic virtual output queued (VOQ) switch with parallel iterative matching (PIM).

FIG. 8 illustrates the throughput of a 32×32 packet switch with equal look-ahead and shift region sizes of 50 kb as compared to VOQ-PIM. The throughput dropped from 92% to 88% to 85% for quasipoisson arrivals as the shifting point was changed (correspondingly) from continuous to 320 bits to 640 bits, as illustrated in FIG. 8. The simulation output shows that the drop for pareto-n was also not severe, i.e., from 68% to 66% to 65% for the same shifting points. Placing the selector element at larger intervals caused some voids in the VSC queues. Unlike some switches, the packet switch may not include void filling, thus the resulting throughput decreased.

The performance of the packet switch was also compared to a conventional electronic switch, a VOQ switch with Parallel Iterative Matching (PIM) scheduling algorithm, modified so that it worked on packets instead of fixed-size cells. FIG. 8 shows that the packet switch did perform similarly to the VOQ-PIM with 50 kb worth of buffering per virtual queue. The VOQ buffer size was selected to match the 50 kb shift region.

Figure 9A:
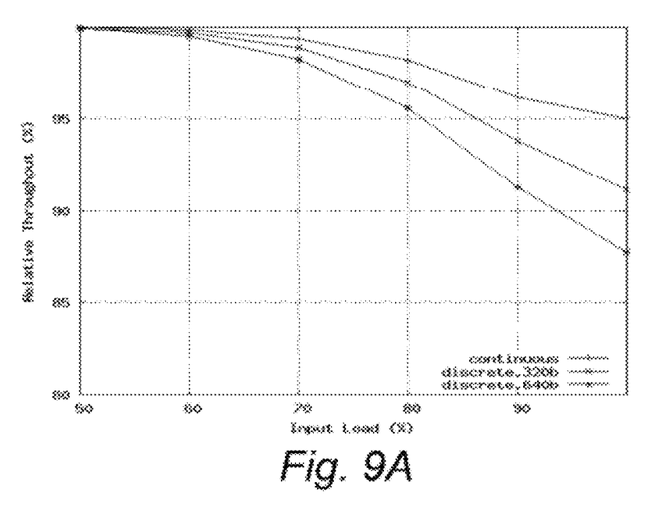
FIGS. 9A and 9B illustrate throughputs of the packet switch illustrated in FIG. 8 relative to the electronic VOQ throughput using a PIM scheduling algorithm.
Figure 9B:
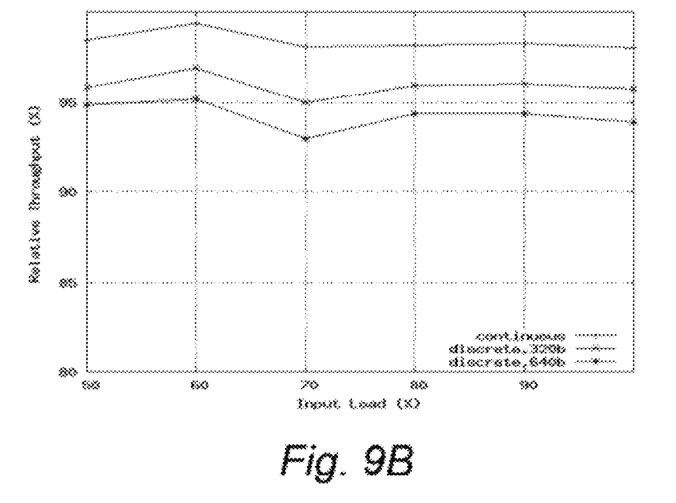

FIGS. 9A and 9B illustrate throughputs of a packet switch illustrated in FIG. 8 shown as relative to the VOQ throughput using a PIM scheduling algorithm. FIG. 9A illustrates quasipoisson; FIG. 9B illustrates pareto-n. To clarify the performance difference, the relative throughput of the packet switch is shown as a ratio to VOQ-PIM throughput in FIG. 9. For bimodal packet sizes, the packet switch performed at 87 to 95% of the VOQ-PIM switch for quasipoisson arrivals and 93 to 98% for pareto-n arrivals.

Figure 10:
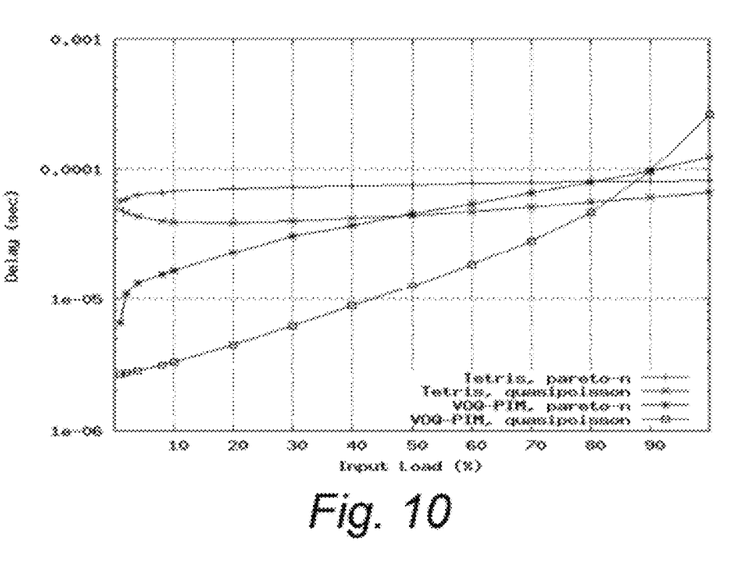
FIG. 10 illustrates average delay of a packet switch compared to an electronic VOQ PIM algorithm for quasipoisson and pareto-n arrivals.

FIG. 10 illustrates average delay of a packet switch compared to VOQ PIM algorithm for quasipoisson and pareto-n arrivals. As illustrated by FIG. 10, the packet switch performed better than VOQ in terms of the average delay experienced by a packet especially at higher input loads. There was a side effect in the delay experienced by a packet in a packet switch. For quasipoisson arrival and bimodal packet sizes, the delay dropped when the input load increases from 0% to 10%. It then increases as the input load increases further. This may have been due to the shifting algorithm, which operates in batches. Step A in the algorithm collects packets in the look-ahead region until time T, which is the time when the first packet is at the start of the Tetris (or shifting) region. Step C, the shifting operation, then starts working at time T. This step tries to shift all packets that are collected while the first packet is propagating through the look-ahead region. The first packet then experiences the whole delay incurred by the look-ahead region. Subsequent packets, however, do not incur the full amount because they are starting to shift in the middle of the look-ahead region. This operation is a batch shifting operation. Thus, the more packets there are in the look-ahead region, the less is the delay. Hence, the average delay experienced decreases as load increases until the delay in the shift region becomes dominant. At that point, the average delay may increase with the input load.

The shifting concept used in the optical version of the packet switch can be applied to electronic switches as well. Instead of using slow light buffers, lithium niobate, optical delays, or optical waveguides as the delay component, the switch can use an analog delay line such as a Bucket Brigade Device (BBD). Conventional electronic shift registers could also be used, but they may use more transistors than BBDs. A recent development in non-volatile memory called racetrack memory may support the shifting concept, i.e., moving the data through a medium. An early example of this concept is the mercury delay line from the 1940s, in which data was represented as sound pulses moving through mercury confined to a metal tube. The concept of moving a packet at variable speed through a medium, whether it is optical, electronic, or even mechanical, may be the main working assumption in the packet switch. Thus, it is expected that the design may be easily applicable to the electronic domain as well.

The combination of VSC queues with a multiplexer and a scheduling mechanism may be a core of the packet switch, and may be useful separately. It may be beneficial in so-called 'access' networks, i.e., networks used to aggregate traffic from a large number of lower-speed networks to a higher-speed core link.

The packet switch provides a promising approach to optical packet switching, and can also support electronic switching, using a new mechanism for packet multiplexing using variable speed conveyor queues. It may achieve high performance for uniformly distributed traffic with a simple scheduling algorithm. This performance may be maintained with as little as 50 kb of delay on each region (a total of 100 kb of delay) for non-bursty traffic. With 50 kb region sizes, the use of slow light buffers are feasible For both bursty and non-bursty traffic, the packet switch may enjoy most of the benefit of VOQ without the need for random-access memory, which has proven extremely difficult to implement with optical technology.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A packet switch for switching packets comprising:
a plurality of input ports, each configured to receive one or more of the packets;
a plurality of output ports, each configured to deliver one or more of the packets;
for each input port, a demultiplexer having an output corresponding to each output port and being configured to receive each packet from the input port and to direct it to one of the outputs based at least in part on information in a header for the packet;
for each output of each demultiplexer, a programmable delay line configured to receive each packet from the output of the demultiplexer and to delay the output of each packet from the programmable delay line for a programmable amount of time which may be re-programmed while the packet is being delayed by the programmable delay line;
for each set of programmable delay lines that are configured to receive packets from the outputs of the demultiplexers that correspond to the same output port:
a programmable delay line controller configured to repeatedly:
program the set of programmable delay lines to delay packets received during a look-ahead period;
at the end of the look-ahead period, determine for the packets which have been received by the set of programmable delay lines during the look-ahead period:
an output sequence for the packets; and
for each of the packets, the amount of remaining delay needed within its programmable delay line to cause the packet to arrive at the output of its programmable delay line in conformance with the determined output sequence; and
after the determining, re-program each of the set of programmable delay lines, as needed, to provide the determined remaining delay for that programmable delay line; and
a multiplexer configured to receive the packets from the outputs of the set of programmable delay lines and to multiplex them together onto the output port that corresponds to the set of programmable delay lines.

2. The packet switch of claim 1 wherein each programmable delay line controller is configured to end each look-ahead period a pre-determined amount of time after it begins.

3. The packet switch of claim 1 wherein each programmable delay line controller is configured to drop one or more of the packets which are received within a look-ahead period when this would facilitate conforming to an output sequence.

4. The packet switch of claim 1 wherein each programmable delay line controller is configured to determine each output sequence based at least on the length of the packets which are the subject of the output sequence.

5. The packet switch of claim 1 wherein each programmable delay line controller is configured to cause the first packet which is received by one of the programmable delay lines during each look-ahead period to be the first packet in each determined output sequence.

6. The packet switch of claim 5 wherein each programmable delay line controller is configured to re-program the programmable delay line which receives the first packet during each look-ahead period to stop delaying the output of the first packet at the end of each look-ahead period.

7. The packet switch of claim 1 wherein each programmable delay line controller is configured to give weight to achieving the lowest possible average output delay when determining each output sequence.

8. The packet switch of claim 1 wherein each programmable delay line controller is configured to give weight to achieving the lowest possible loss of packets when determining each output sequence.

9. The packet switch of claim 1 wherein each programmable delay line controller is configured to give weight to prioritizing information when determining each output sequence.

10. The packet switch of claim 1 wherein the input ports, the demultiplexers, the programmable delay lines, the multiplexers, and the output ports are all optical devices configured to process packets that are carried by light.

11. The packet switch of claim 10 wherein there are no more than one hundred different possible choices for each determined remaining delay.

12. The packet switch of claim 10 wherein there are no more than ten different possible choices for each determined remaining delay.

13. The packet switch of claim 1 wherein the packet switch does not contain any memory devices configured to buffer any of the packets.

14. The packet switch of claim 1 wherein the programmable delay line controller is configured to determine an optimal sequence for packets of different length.

15. A multiplexing device for multiplexing packets comprising:
a plurality of input ports, each configured to receive one or more of the packets;
an output port configured to deliver the packets;
for each input port, a programmable delay line configured to receive each packet from the input port and to delay the output of each packet from the programmable delay line for a programmable amount of time which may be re-programmed while the packet is being delayed by the programmable delay line;
a programmable delay line controller configured to repeatedly:
program the programmable delay lines to delay packets received during a look-ahead period;
at the end of the look-ahead period, determine for the packets which have been received by the programmable delay lines during the look-ahead period:
an output sequence for the packets; and
for each of the packets, the amount of remaining delay needed within its programmable delay line to cause the packet to arrive at the output of its programmable delay line in conformance with the determined output sequence; and
after the calculating, re-program each of the programmable delay lines, as needed, to provide the determined remaining delay for that programmable delay line; and
a multiplexer configured to receive the packets from the outputs of the programmable delay lines and to multiplex them together onto the output port.

16. The multiplexing device of claim 15 wherein each programmable delay line controller is configured to end each look-ahead period a pre-determined amount of time after it begins.

17. The multiplexing device of claim 15 wherein each programmable delay line controller is configured to drop one or more of the packets which are received within a look-ahead period when this would facilitate conforming to an output sequence.

18. The multiplexing device of claim 15 wherein each programmable delay line controller is configured to determine each output sequence based at least on the length of the packets which are the subject of the output sequence.

19. The multiplexing device of claim 15 wherein each programmable delay line controller is configured to cause the first packet which is received by one of the programmable delay lines during each look-ahead period to be the first packet in each determined output sequence.

20. The multiplexing device of claim 19 wherein each programmable delay line controller is configured to re-program the programmable delay line which receives the first packet during each look-ahead period to stop delaying the output of the first packet at the end of each look-ahead period.

21. The multiplexing device of claim 15 wherein each programmable delay line controller is configured to give weight to achieving the lowest possible average output delay when determining each output sequence.

22. The multiplexing device of claim 15 wherein each programmable delay line controller is configured to give weight to achieving the lowest possible loss of packets when determining each output sequence.

23. The multiplexing device of claim 15 wherein each programmable delay line controller is configured to give weight to prioritizing information when determining each output sequence.

24. The multiplexing device of claim 15 wherein the input ports, the programmable delay lines, the multiplexer, and the output port are all optical devices configured to process packets that are carried by light.

25. The multiplexing device of claim 24 wherein there are no more than one hundred different possible choices for each determined remaining delay.

26. The multiplexing device of claim 24 wherein there are no less than ten different possible choices for each determined remaining delay.

27. The multiplexing device of claim 15 wherein the multiplexing device packet switch does not contain any memory devices configured to buffer any of the packets.

28. The multiplexing device of claim 15 wherein the programmable delay line controller is configured to determine an optimal sequence for packets of different length.

* * * * *